United States Patent Office 3,139,388
Patented June 30, 1964

3,139,388
METHOD OF PRODUCING CEPHALOSPORIN C
Thomas Boyne Platt, Neshanic Station, and William Robert Frazier, New Brunswick, N.J., assignors to Olin Mathieson Chemical Corporation, New York, N.Y., a corporation of Virginia
No Drawing. Filed Jan. 4, 1963, Ser. No. 249,320
7 Claims. (Cl. 195—36)

This invention relates to an improved method for preparing cephalosporin C and more particularly to an improvement in the method for preparing cephalosporin C microbiologically.

Prior to this invention, it was known that cephalosporin C could be prepared microbiologically by the action of certain species and strains of microorganisms of the genus Cephalosporium. Among such strains are Cephalosporium sp. strain CMI 49137 and mutants thereof, such as mutant 8650. Prior to this invention it was also known that in order to increase the yield of desired cephalosporin C, a methionine had to be added to the nutrient medium. By "a methionine" is meant DL-methionine, D-methionine, L-methionine, and compounds which probably are converted to methionine in situ, such as methionine-sulfoxide, L-cysteine, and S-methyl-L-cysteine.

It has now been found that cephalosporin C can be obtained in higher yields if a cephalosporin C producing strain of Cephalosporium is cultured in a methionine supplemented nutrient medium containing certain additional compounds. These compounds can be classified as follows: aromatic carboxylic acids, phenols, polyhydroxy-polyhydrobenzoic acids, polyalcohols, sugar acids, and alkylated or acylated derivatives of amino acids. Specific examples of such compounds include 3,4,5-trimethoxybenzoic acid, shikimic acid, folic acid, glucuronic acid, i-erythritol, tannic acid, trimellitic acid, inositol, quinic acid, galacturonic acid, catechol, glycerol, pyrogallol, ascorbic acid, and betaine.

These compounds are preferably added so as to be present in a concentration of about 0.001% to about 0.5% weight by volume of the total fermentation medium, and optimally about 0.005% to about 0.25%.

The fermentation medium otherwise contains the normal nutrients (including a methionine) previously used in microbial production of cephalosporin C. Thus, the medium contains an assimilable source of carbon and energy, such as a carbohydrate (e.g., sucrose, lactose, glucose and the like) and a source of nitrogen, such as meat extract, fish meal, cornsteep liquor and peanut meal. The microorganism is grown in or on the aqueous nutrient medium under aerobic conditions for about 3 to about 6 days, optimally about 4 to about 5 days, at a temperature in the range of about 23° C. to about 27° C., after which the antibiotics are recovered from the medium in the usual manner. The methionine is preferably present in a concentration of about 0.05% to about 1.5% and optimally about 0.4% to about 0.8%.

In addition to producing cephalosporin C, the fermentation usually results in the coproduction of penicillin N and cephalosporin P, which can be separated from the desired cephalosporin C in the usual manner.

To show the utilization of the compounds added in accordance with the instant invention in the production of cephalosporin C, comparative experiments were conducted as indicated in the following table and the potency of the resulting fermentation broths measured. In all these tests the same general procedure was used, the only change being the addition of the indicated compound at the indicated concentration.

To prepare the fermentation medium, an inoculum obtained by growing Cephalosporium sp. strain CMI 49137, mutant 8650 (obtained from the Antibiotics Research Station, Clevedon, Somerset, England) was grown for 72 hours with shaking in 100 ml. of a sterile aqueous medium containing 4% cornsteep liquor, 2% lactose, 0.5% glucose, 0.3% $NaNO_3$, 0.05% $K_2HPO_4$ and 0.025% $MgSO_4 \cdot 7H_2O$. This culture was used to inoculate a 250 ml. Erlenmeyer flask containing 50 ml. of the following sterile aqueous medium: 2% Pharmamedia (a cottonseed-derived protein nutrient sold by Traders Oil Mill Company, Fort Worth, Texas), 2% peanut meal, 4% lactose, 1.0% $CaCO_3$, 0.2% $CaSO_4$, 0.1% $Na_2SO_4$ and 0.05% DL-methionine. The flask was then incubated at 25° C. for 6 days on a rotary shaker operated at 280 revolutions per minute.

The antibiotic potencies of the fermentation broth were determined with an agar diffusion assay using *Salmonella gallinarum* as the test organism. This organism is insensitive to the cephalosporin P antibiotics. The cephalosporin C potency is equivalent to the antibiotic activity remaining after treatment of broth dilutions with 125 units per ml. of Penicillinase A (Riker Laboratories, Inc., Northridge, California) to eliminate the antibiotic activity of penicillin N. Penicillin N potency is estimated by the difference between the total and penicillinase-resistant antibiotic activities.

The following table shows the results of the various experiments:

| Example | Compound Added | Effective Concentration (Percent) | Antibiotic Potency (in micrograms/ml.) | |
|---|---|---|---|---|
| | | | Cephalosporin (C) | Penicillin (N) |
| 1 | Control | | 350 | 210 |
| 2 | 3,4,5-Trimethoxybenzoic acid | 0.1 | 500 | 300 |
| 3 | Shikimic acid | 0.05 | 480 | 230 |
| 4 | Folic acid | 0.005 | 480 | 200 |
| 5 | Glucuronic acid | 0.01 | 470 | 230 |
| 6 | i-Erythritol | 0.05 | 470 | 280 |
| 7 | Tannic acid | 0.01 | 460 | 230 |
| 8 | Trimellitic acid | 0.01 | 460 | 230 |
| 9 | Inositol | 0.02 | 450 | 350 |
| 10 | Quinic acid | 0.1 | 450 | 220 |
| 11 | Galacturonic acid | 0.025 | 450 | 150 |
| 12 | Glycerol | 0.25 | 440 | 130 |
| 13 | Catechol | 0.01 | 430 | 170 |
| 14 | Pyrogallol | 0.01 | 430 | 170 |
| 15 | Ascorbic acid | 0.07 | 420 | 230 |
| 16 | Betaine | 0.05 | 420 | 190 |

This invention may be variously otherwise embodied within the scope of the appended claims.

What is claimed is:
1. In a method for producing cephalosporin C by culturing a cephalosporin C producing strain of Cephalosporium in a methionine supplemented nutrient medium, the improvement which comprises adding to said medium a compound selected from the group consisting of 3,4,5-trimethoxybenzoic acid, shikimic acid, folic acid, glucuronic acid, i-erythritol, tannic acid, trimellitic acid, inositol, quinic acid, galacturonic acid, glycerol, catechol, pyrogallol, ascorbic acid and betaine.

2. The method of claim 1 wherein the compound is added in a proportion of about 0.001% to about 0.5% by weight based on the total volume of the medium.

3. The method of claim 2 wherein the compound is 3,4,5-trimethoxybenzoic acid.

4. The method of claim 2 wherein the compound is shikimic acid.

5. The method of claim 2 wherein the compound is folic acid.

6. The method of claim 2 wherein the compound is glucuronic acid.

7. The method of claim 2 wherein the compound is i-erythritol.

References Cited in the file of this patent

UNITED STATES PATENTS

| | | |
|---|---|---|
| 2,768,117 | Kaplan | Oct. 23, 1956 |
| 2,831,797 | Miller et al. | Apr. 22, 1958 |
| 2,883,328 | Florey et al. | Apr. 21, 1959 |